US010671929B2

(12) United States Patent
Boguraev et al.

(10) Patent No.: US 10,671,929 B2
(45) Date of Patent: Jun. 2, 2020

(54) QUESTION CORRECTION AND EVALUATION MECHANISM FOR A QUESTION ANSWERING SYSTEM

(71) Applicant: International Business Machines Corporation, Armonk, NY (US)

(72) Inventors: Branimir K. Boguraev, Bedford, NY (US); John P. Bufe, III, Washington, DC (US); Matthew T. Hatem, Portsmouth, NH (US); Jared M. D. Smythe, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1609 days.

(21) Appl. No.: 14/472,513

(22) Filed: Aug. 29, 2014

(65) Prior Publication Data

US 2016/0062980 A1    Mar. 3, 2016

(51) Int. Cl.
*G06N 5/04* (2006.01)
(52) U.S. Cl.
CPC ...................... *G06N 5/04* (2013.01)
(58) Field of Classification Search
CPC .......... G06N 5/04; G06N 5/02; G06N 99/005; G09B 7/04; G06F 9/4446
USPC .......................................................... 706/11
See application file for complete search history.

(56) References Cited

U.S. PATENT DOCUMENTS

| 5,485,372 A * | 1/1996 | Golding ................ G06F 17/273 |
| | | 704/9 |
| 6,523,172 B1 * | 2/2003 | Martinez-Guerra .... G06F 8/427 |
| | | 704/9 |
| 8,370,743 B2 * | 2/2013 | Bala ...................... G06F 3/0481 |
| | | 715/705 |
| 8,601,030 B2 | 12/2013 | Bagchi et al. |
| 8,738,617 B2 | 5/2014 | Brown et al. |

(Continued)

FOREIGN PATENT DOCUMENTS

WO    WO 2015187126 A1 * 12/2015 ........... G06F 17/241

OTHER PUBLICATIONS

"Method of Computing Relevancy Score in a Question and Answering System", Disclosed Anonymously, IP.com, IPCOM000222407D, IP.com Electronic Publication, Oct. 2, 2012, 4 pages.
Bhagwat, Anand B. et al., "Interpreting and Distinguishing Lack of an Answer in a Question Answering System", filed Jul. 17, 2014, U.S. Appl. No. 14/334,493.

(Continued)

*Primary Examiner* — Ann J Lo
*Assistant Examiner* — Viker A Lamardo
(74) *Attorney, Agent, or Firm* — Francis Lammes; Stephen J. Walder, Jr.; Diana R. Gerhardt

(57) ABSTRACT

Mechanisms are provided in a question answering (QA) system comprising a QA system pipeline that analyzes an input question and generates an answer to the input question, for pre-processing the input question. The mechanisms receive an input question and input the input question to a pre-processor flow path having one or more pre-processors. The one or more pre-processors transform the input question into a transformed question by correcting errors in a formulation of the input question that are determined to be detrimental to efficient and accurate processing of the input question by a QA system pipeline of the QA system. The transformed question is then input to the QA system pipeline of the QA system which processes the transformed question to generate and output an answer to the input question.

12 Claims, 6 Drawing Sheets

(56) References Cited

U.S. PATENT DOCUMENTS

| | | | |
|---|---|---|---|
| 2005/0131872 A1* | 6/2005 | Calbucci | G06F 17/30672 |
| 2009/0287678 A1 | 11/2009 | Brown et al. | |
| 2011/0066587 A1 | 3/2011 | Ferrucci et al. | |
| 2011/0125734 A1 | 5/2011 | Duboue et al. | |
| 2012/0021783 A1* | 1/2012 | Wilson | G06F 17/2785 |
| | | | 455/466 |
| 2012/0253793 A1* | 10/2012 | Ghannam | G06F 17/2785 |
| | | | 704/9 |
| 2012/0303356 A1* | 11/2012 | Boyle | G06F 17/30672 |
| | | | 704/9 |
| 2013/0007055 A1 | 1/2013 | Brown et al. | |
| 2013/0018652 A1 | 1/2013 | Ferrucci et al. | |
| 2013/0052630 A1 | 2/2013 | Mine et al. | |
| 2013/0066886 A1 | 3/2013 | Bagchi et al. | |
| 2017/0132314 A1* | 5/2017 | Liu | G06F 17/30687 |

OTHER PUBLICATIONS

Giffels, Kenneth M. et al., "Displaying Quality of Question Being Asked a Question Answering System", filed Jun. 19, 2014, U.S. Appl. No. 14/309,637.

High, Rob, "The Era of Cognitive Systems: An Inside Look at IBM Watson and How it Works", IBM Corporation, Redbooks, Dec. 12, 2012, 16 pages.

SPI DST, et al., "On the Complexity of Computing Probabilistic Assertions", IP.com, IPCOM000150849D, IP.com Electronic Publication, Apr. 19, 2007, 24 pages.

Tellez-Valero, Alberto et al., "Towards Multi-Stream Question Answering Using Answer Validation", Informatica 34 (2010) 45-54, Jan. 29, 2009, pp. 45-54.

Yuan, Michael J., "Watson and healthcare, How natural language processing and semantic search could revolutionize clinical decision support", IBM developerWorks, IBM Corporation, Apr. 12, 2011, 14 pages.

* cited by examiner

QUESTION CORRECTION AND EVALUATION MECHANISM FOR A QUESTION ANSWERING SYSTEM

BACKGROUND

The present application relates generally to an improved data processing apparatus and method and more specifically to question correction and evaluation mechanisms for a Question Answering (QA) system.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question Answering (QA) systems which take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the IBM Watson™ system available from International Business Machines (IBM) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Various United States patent application Publications describe various types of Question Answering systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model.

SUMMARY

In one illustrative embodiment, a method in a question answering (QA) system comprising a QA system pipeline that analyzes an input question and generates an answer to the input question, for pre-processing the input question is provided. The method comprises receiving, by the QA system, an input question for which an answer is sought by a submitter of the input question and inputting, by the QA system, the input question to a pre-processor flow path comprising at least one pre-processor. The method further comprises transforming, by the at least one pre-processor, the input question into a transformed question by correcting errors in a formulation of the input question that are determined to be detrimental to efficient and accurate processing of the input question by a QA system pipeline of the QA system. In addition, the method comprises inputting the transformed question to the QA system pipeline of the QA system processing the transformed question via the QA system pipeline to generate and output at least one answer to the input question.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
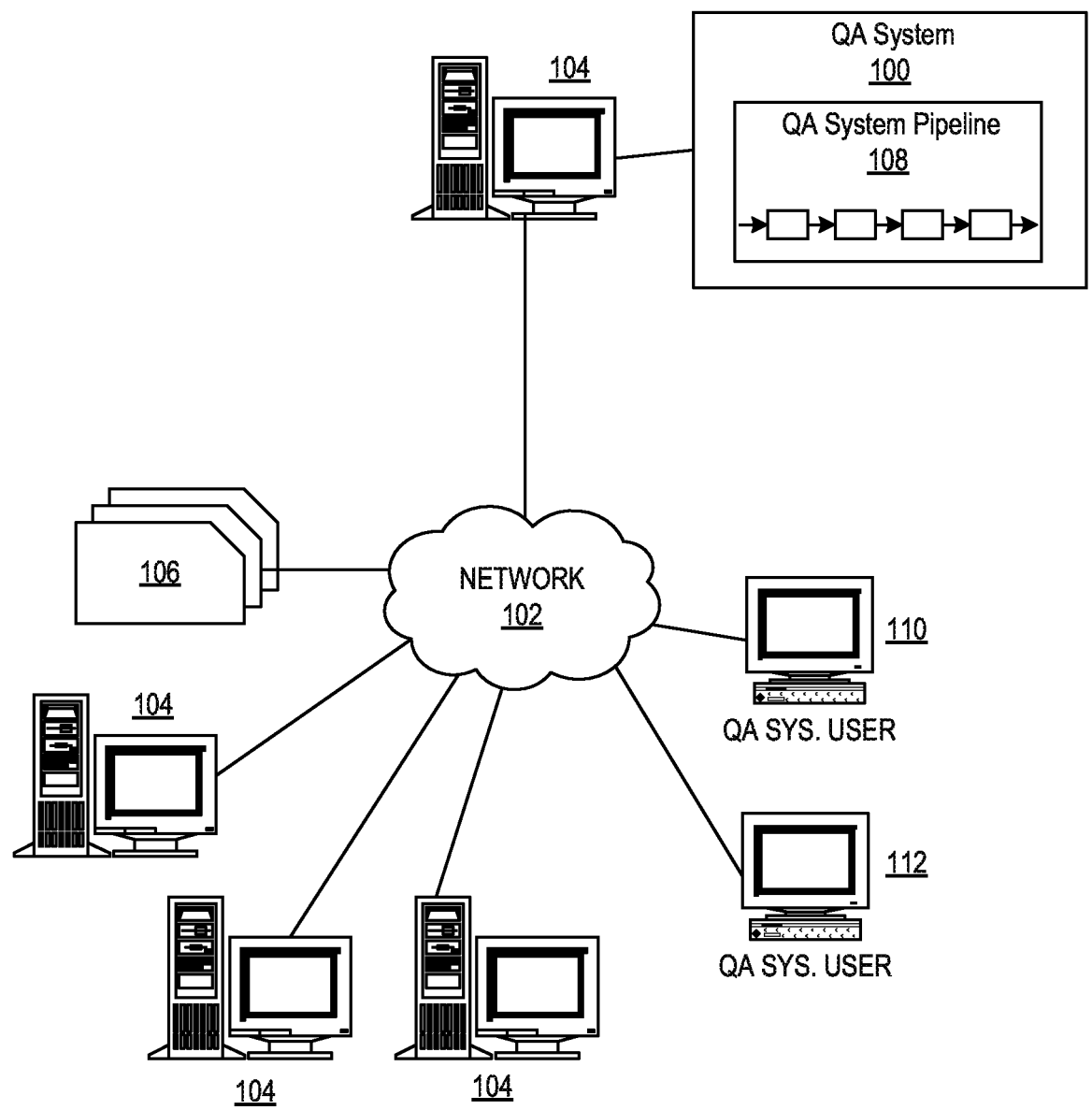
FIG. 1 depicts a schematic diagram of one illustrative embodiment of a question/answer creation (QA) system in a computer network.

Question Answering (QA) systems operate on input questions that may come from a wide variety of sources, such as voice-to-text applications, keyboard input from human users via a computing device, mobile communication devices with sometimes difficult interfaces to operate, and the like. As a result, the textual input question that is provided to the QA system may have various levels of completeness, correctness, and the like, from a semantic, syntactic, and grammatical view point, e.g., conversion of voice input to text may result in missing or incomplete textual input, individuals may use conversational conventions when entering an input question, which may cause too much or too little information to be included in such text, human errors in using interfaces for inputting the text may be encountered, and the like. QA systems perform syntactic and semantic analysis on this input text to generate a syntactic parse tree of the input text, identify named entities in the text, and perform other structure and reference information analysis on the text before performing the deep analysis and processing of the text to generate answers to input questions. The accuracy of this analysis greatly affects the reliability of later components of the QA system, i.e. components operating downstream in a QA system pipeline, to operate correctly and return the appropriate results.

Analysis components of QA systems generally rely on the input to these components being grammatically and semantically correct. However, in real world applications, most input to such analysis components have spelling, orthographic, or syntactic errors. In addition, if an input question has too much information content or too little information content included in the input question, it may be difficult for the analysis components, including parser and search engine, to analyze the input question to determine appropriate queries to be applied against a corpus for answer generation.

The illustrative embodiments provide question analysis and correction mechanisms for a Question Answering (QA) system. In particular, the mechanisms of the illustrative embodiments provide logic implemented in, or executed on, hardware for facilitating operations to analyze questions input to a QA system to determine whether the question is semantically, syntactically, and grammatically correct and to determine if there is too much, or too little, content within the input question to ensure accuracy in the operation of the QA system when processing the input question. The mechanisms of the illustrative embodiments further provide logic implemented in, or executed on, hardware for facilitating operations to correct input questions that are determined to be semantically, syntactically, or grammatically incorrect or determined to have too much, or too little, content for accurate operation of the QA system when processing the input question. These mechanisms, in some illustrative embodiments, may be implemented as pre-processors of a QA system pipeline that operate on the input question prior to the input question being processed through the QA system pipeline to generate an answer to the input question.

As mentioned above, in some illustrative embodiments, these pre-processors operate on the input question to identify input questions that have too much, or superfluous, information content that may cause inefficient operation of the QA system and may cause the QA system to fail to generate answers to the input question with the highest possible accuracy. For example, this superfluous information may be, for example, vocative clauses, common phrases, or the like. To illustrate this further, consider a scenario where the input question is of the type "Can you please tell me who the president is?" The phrase "can you please tell me" is superfluous to the question and may cause the QA system to expend resources analyzing this portion of the question with no appreciative improvement in the final answer to the question that is generated by the QA system. More importantly, this superfluous material may pollute (and dilute) query generation resulting in a less focused query applied to the corpus or corpora from which answers are generated. The pre-processors of the illustrative embodiments may identify such superfluous terms/phrases in the input questions and may transform these input questions to remove such superfluous terms/phrases before further processing of the input question by the QA system.

As also mentioned above, in some illustrative embodiments, the pre-processors operate on the input question to identify input questions that have too little information content which may make it difficult for the QA system to identify and extract features from the input question necessary for the QA system to properly parse and analyze the input question. That is, the pre-processors may identify the situation where there is missing information in the input content and may identify the type of missing information in the input question. Examples of such information that may be missing from an input question include elided focus, elided verbs, other elided phrases, or the like. The missing content from the input question may be added to the input question so as to provide additional content upon which the QA system may operate. One example to illustrate this missing information that may be identified is the question "How many calories in a potato?" where the verb is missing from this question, i.e. the properly formed question is "How many calories are in a potato?" The pre-processors of the illustrative embodiments may identify that such information is missing from an input question and may correct/transform the input question by providing the missing information content.

Thus, with the mechanisms of the illustrative embodiments, input questions are pre-processed and corrected to ensure the most accurate operation of the QA system possible when processing the input question. This correction of the question may include removal of superfluous information or content in the input question or the addition of additional information or content to assist the QA system in processing the input question. Moreover, the input question may be reformulated to correct semantic and grammatical errors to ensure that the question is well formulated for QA system processing.

In some illustrative embodiments, mechanisms are provided for evaluating the order in which pre-processors of this type are executed on the input question to determine a best ordering or configuration of the pre-processors to achieve optimum results. For example, a set of training questions with their appropriately modified forms may be passed to the preprocessor paths. Each path will then be able to generate a score at the end of the path's processing of the training question and compares the modified form of the question generated by the pre-processor path to a known desired form of the training question. A feature may be generated for each preprocessor describing how much of the question was changed by the preprocessor path and how confident the system is in the changes made. Based on the final comparison scores from the different paths, machine learning can be used to determine what the optimal weights are for the features such that in subsequent runs, the QA system is able to select a pre-processor path that is most likely to provide the best results for processing the question.

Before beginning a more detailed discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
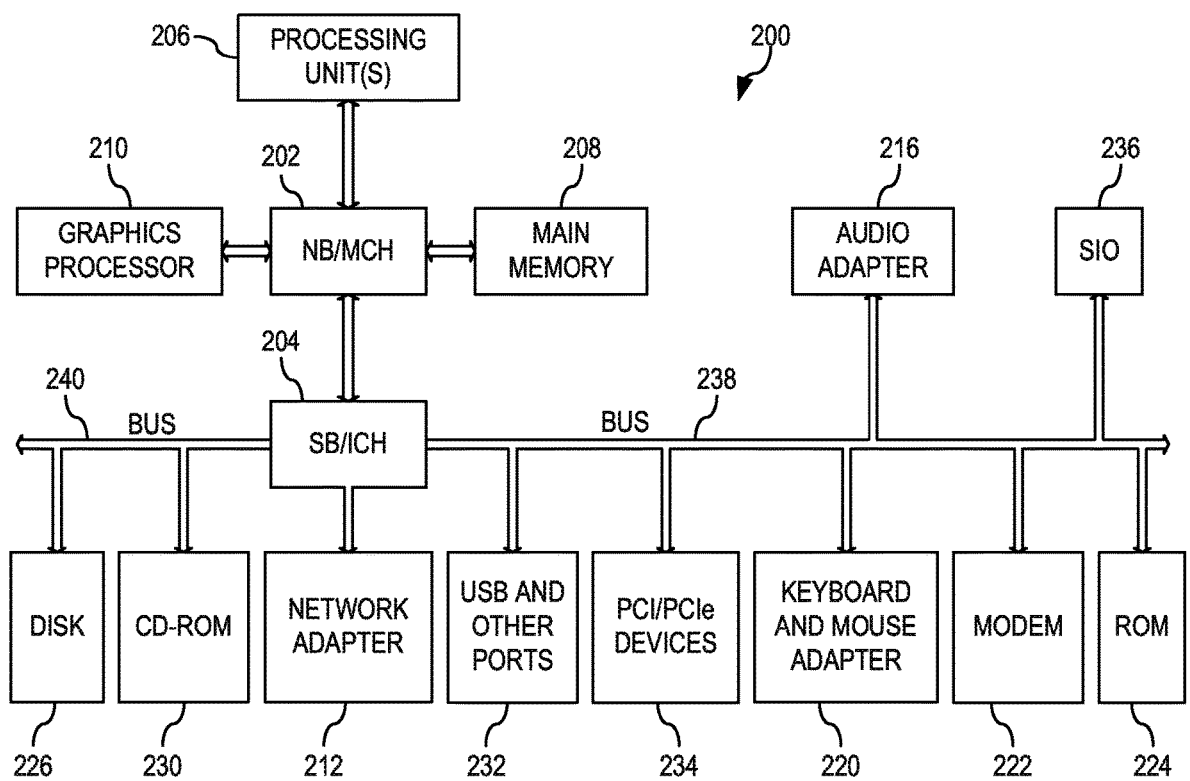
FIG. 2 is a block diagram of an example data processing system in which aspects of the illustrative embodiments are implemented.
Figure 3:
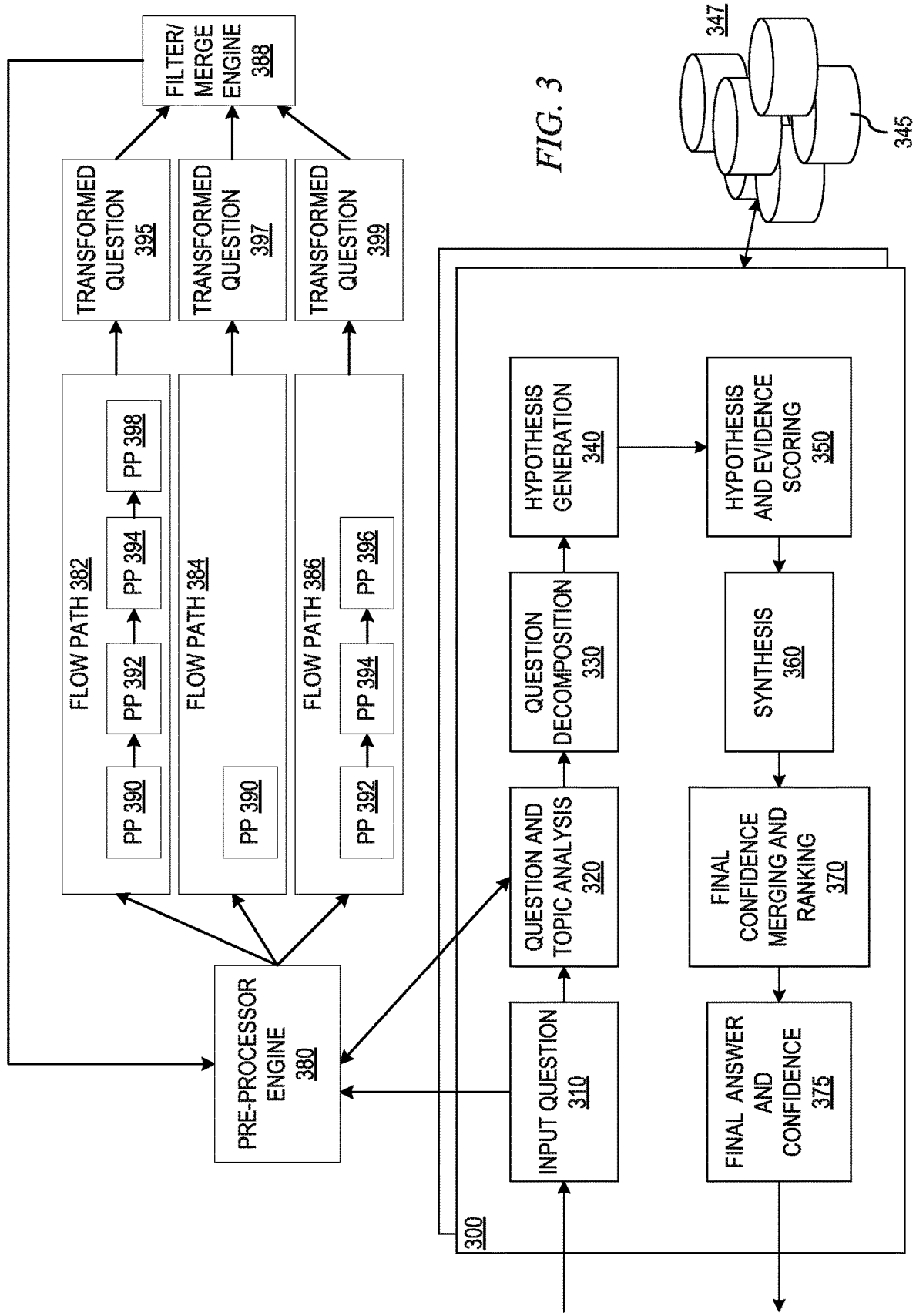
FIG. 3 illustrates a QA system pipeline for processing an input question in accordance with one illustrative embodiment.

FIGS. 1-3 are directed to describing an example Question Answering (QA) system (also referred to as a Question/Answer system or Question and Answer system), method, and computer program product with which the mechanisms of the illustrative embodiments are implemented. As will be discussed in greater detail hereafter, the illustrative embodiments are integrated in, augment, and extend the functionality of these QA mechanisms with regard to processing input questions to identify errors in the correctness of the input question, remove superfluous content in the input question, and/or add additional content to aid in the QA system pipeline's analysis of the input question when necessary. That is, the mechanisms of the illustrative embodiments improve the operation of a QA system by providing pre-processing logic and mechanisms for analyzing and correcting input questions so that they are well formed for processing by the QA system pipeline.

Thus, in order to understand the context in which the improvements of the illustrative embodiments are implemented, it is important to first have an understanding of how question and answer creation in a QA system is implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments are implemented. Many modifications to the example QA system shown in FIGS. 1-3 may be implemented in various embodiments of the present invention without departing from the spirit and scope of the present invention.

As an overview, a Question Answering system (QA system) is an artificial intelligence application executing on data processing hardware that answers questions pertaining to a given subject-matter domain presented in natural language. The QA system receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA system. The document may include any file, text, article, or source of data for use in the QA system. For example, a QA system accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to the QA system which then answers the input questions using the content in the corpus of data by evaluating documents, sections of documents, portions of data in the corpus, or the like. When a process evaluates a given section of a document for semantic content, the process can use a variety of conventions to query such a document from the QA system, e.g., sending the query to the QA system as a well-formed question which is then interpreted by the QA system and a response is provided containing one or more answers to the question. Semantic content is content based on the relation between signifiers, such as words, phrases, signs, and symbols, and what they stand for, their denotation, or connotation. In other words, semantic content is content that interprets an expression, by using Natural Language Processing mechanisms, for example.

As will be described in greater detail hereafter, the QA system receives an input question, analyzes the question to extract the major features of the question, uses the extracted features to formulate queries, and then applies those queries to the corpus of data. Based on the application of the queries to the corpus of data, the QA system generates a set of hypotheses, or candidate answers to the input question, by looking across the corpus of data for portions of the corpus of data that have some potential for containing a valuable response to the input question. The QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA system. The statistical model is used to summarize a level of confidence that the QA system has regarding the evidence that the potential response, i.e. candidate answer, is inferred by the question. This process is repeated for each of the candidate answers until the QA system identifies candidate answers that surface as being significantly stronger than others and thus, generates a final answer, or ranked set of answers, for the input question.

As mentioned above, QA systems and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering (QA) systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, annotate or otherwise generate metadata for providing information useable by the QA system to identify these questions and answer attributes of the content.

Operating on such content, the QA system generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The QA system 100 and network 102 enables question/answer (QA) generation functionality for one or more QA system users via their respective computing devices 110-112. Other embodiments of the QA system 100 may be used with components, systems, sub-systems, and/or devices other than those that are depicted herein.

The QA system 100 is configured to implement a QA system pipeline 108 that receive inputs from various sources. For example, the QA system 100 receives input from the network 102, a corpus of electronic documents 106, QA system users, and/or other data and other possible sources of input. In one embodiment, some or all of the inputs to the QA system 100 are routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document includes any file, text, article, or source of data for use in the QA system 100. QA system users access the QA system 100 via a network connection or an Internet connection to the network 102, and input questions to the QA system 100 that are answered by the content in the corpus of data 106. In one embodiment, the questions are formed using natural language. The QA system 100 parses and interprets the question, and provides a response to the QA system user, e.g., QA system user 110, containing one or more answers to the question. In some embodiments, the QA system 100 provides a response to users in a ranked list of candidate answers while in other illustrative embodiments, the QA system 100 provides a single final answer or a combination of a final answer and ranked listing of other candidate answers.

The QA system 100 implements a QA system pipeline 108 which comprises a plurality of stages for processing an input question and the corpus of data 106. The QA system pipeline 108 generates answers for the input question based on the processing of the input question and the corpus of data 106. The QA system pipeline 108 will be described in greater detail hereafter with regard to FIG. 3.

In some illustrative embodiments, the QA system 100 may be the IBM Watson™ QA system available from International Business Machines Corporation of Armonk, N.Y., which is augmented with the mechanisms of the illustrative embodiments described hereafter. As outlined previously, the IBM Watson™ QA system receives an input question which it then analyzed to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The IBM Watson™ QA system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the IBM Watson™ QA system has regarding the evidence that the potential response, i.e. candidate answer, is inferred by the question. This process is repeated for each of the candidate answers to generate ranked listing of candidate answers which may then be presented to the user that submitted the input question, or from which a final answer is selected and presented to the user. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA system pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA system pipeline 300 comprises a plurality of stages 310-375 through which the QA system operates to analyze an input question and generate a final response. In an initial question input stage 310, the QA system receives an input question that is presented in a natural language format. That is, a user inputs, via a user interface, an input question for which the user wishes to obtain an answer, e.g., "Who are Washington's closest advisors?" In response to receiving the input question, the next stage of the QA system pipeline 300, i.e. the question and topic analysis stage 320, analyzes the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "what drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA system pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA system and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics of evidence passages and their relative importance to overall candidate answer generation.

The weighted scores are processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 375, a final answer and confidence score, or final set of candidate answers and confidence scores, are generated and output to the submitter of the original input question via a graphical user interface or other mechanism for outputting information.

As shown in FIG. 3, in accordance with the mechanisms of the illustrative embodiments, the QA system pipeline 300 is augmented to include pre-processor engine 380 for pre-processing the input question received in stage 310. The pre-processor engine 380 may coordinate and control the processing of the input question via one or more pre-processor flow paths 382-386. Each of the one or more pre-processor flow paths 382-386 comprises one or more pre-processors (PPs) 390-398 in various ordered combinations. The same pre-processor may be present in multiple flow paths 382-386 with each flow path 382-386 being a different ordered combination of pre-processors 390-398. In one illustrative embodiment, there is a separate pre-processor flow path 382-386 for each possible combination of pre-processors 390-398, however, this is not required and in other illustrative embodiments, due to timing considerations and memory constraints for example, a smaller number of pre-processor flow paths 382-386 having desired ordered combinations of pre-processors may be utilized. The pre-processor flow paths 382-386 may be manually constructed by a system administrator or other authorized personnel, or may be generated through a machine learning process, as described above and hereafter, which evaluates various possible pre-processor flow paths using training question sets, known desired forms of training questions, and scoring algorithms, and determines the ones that provide the most preferred results.

The input question is passed to each of the pre-processor flow paths 382-386. The pre-processors 390-398 of the pre-processor flow paths 382-386 operate on the input question to transform the input question into a corrected alternative question. Each of the pre-processors 390-398 is configured to perform a particular analysis and transformation of the input question to thereby correct at least a portion of the input question in view of the results of the analysis. For example, a first pre-processor 392 may be configured to identify grammatical errors, such as capitalization errors, punctuation errors, or any other types of errors in language use in the input question, and may correct these errors to generate a corrected input question. A second pre-processor 394 may be configured to analyze the input question to identify spelling errors. A third pre-processor 396 may be configured to identify whether or not the input question provides too little information content for QA system processing of the input question. A fourth pre-processor 398 may be configured to identify whether or not the input question includes superfluous content that can be removed from the input question to enhance QA system processing of the input question.

When operating on the input question, for example, the pre-processors may operate on a syntactic parse output, such as one or more syntactic parse trees for example, of the input question. As such, the pre-processors may in fact be integrated within the question and topic analysis stage 320 or may make use of the mechanisms in this stage 320 for generating the syntactic parse tree.

Each of the pre-processors 392-398 may operate based on a pattern matching, term/phrase lookup operation, or algorithmic logic that identifies portions of text within the input question that are indicative of a need to correct the input question in one fashion or another. For example, the first pre-processor 392 may be configured with algorithms implementing rules which may be used to identify grammatical errors in text and determine a correction for such grammatical errors. The second pre-processor 394 may be configured with a dictionary data structure that can be used to identify incorrectly spelled terms and corrections for such terms. The third pre-processor 396 may be configured with pattern matching algorithms and lookup data structures identifying trigger terms and/or phrases that are indicative of too little information content being present within the input question and identifying corrections to add necessary information content for proper processing of the input question by the remainder of the QA system pipeline 300. The fourth pre-processor 398 may likewise be configured with pattern matching algorithms and lookup data structures identifying trigger terms and/or phrases that are indicative of superfluous text within the input question that may be omitted from the input question to improve the processing of the input question. Further details and examples of the manner by which the pre-processors 390-398 operate will be provided herein below.

The input question may be processed in parallel by each of the separate pre-processor flow path 382-386, i.e. by the ordered combination of pre-processors 390-398 in each flow path 382-386. Each pre-processor 390-398 in the pre-processor flow path 382-386 receives the input question and, based on its configured logic, recognized patterns, lookup data structures and/or the like, determines if and how the input question should be transformed and then returns the transformed question. The question that is input to the pre-processor 390-398 may be the original input question or may be an already partially corrected/transformed question that has already been operated on by another pre-processor 390-398 in the ordered combination of pre-processors associated with the particular pre-processor flow path 382-386. For example, if a the pre-processor 394 is downstream in the pre-processor flow path 382 from pre-processor 390, the output generated by pre-processor 390 may be the question that is input to pre-processor 394. Thus, pre-processor 394 in this scenario would be correcting identified issues in the partially corrected/transformed question output by the pre-processor 390. Alternatively, each pre-processor 390-398 in a pre-processor flow path 382-386 may operate separately on the input question and the results of each of the pre-processors 390-398 in the particular flow path 382-386 may be combined in a last stage of the flow so as to generate a corrected/transformed question.

Each of the pre-processor flow paths 382-386 may output a separately generated corrected/transformed question 395, 397, 399 that may be submitted to the QA system pipeline 300, or separate QA system pipelines 300 operating in parallel, for further processing. A filtering/merging engine 388 may be provided for filtering out duplicate corrected/transformed questions output by the various flow paths 382-386 prior to submitting the remaining corrected/transformed questions to the QA system pipeline(s) 300. In other illustrative embodiments, described hereafter, the filtering/merging engine 388 may also merge the corrected/transformed questions by selecting, based on predefined criteria and characteristics of the corrected/transformed questions, one of the corrected/transformed questions output by the various flow paths 382-388 for further processing by the QA system pipeline 300.

Assuming an embodiment in which multiple corrected/transformed questions are submitted to the QA system pipeline 300, the QA system pipeline 300 analyzes the corrected/transformed question in the manner previously described above to thereby generate a set of candidate answers and/or a final answer for the corrected/transformed question. Thus, multiple possible sets of candidate answers and/or final answers may be generated, one for each corrected/transformed question that is output by the different pre-processor flow paths 382-386. The multiple possible sets of candidate answers, with their corresponding confidence scores/measures, may be merged in the final confidence merging and ranking stage 370, or an additional final confidence merging and ranking stage (not shown) that collects the sets of candidate answers from multiple QA system pipelines 300, and a final answer to the input question received in stage 310 may be generated and output, e.g., a highest ranking candidate answer after the merging of all of the candidate answers from each of the sets of candidate answers may be selected for output as the final answer. Alternatively a ranked listing of a plurality of candidate answers may be generated based on the merge and output to the submitter of the input question.

As mentioned above, in some illustrative embodiments, rather than submitting multiple corrected/transformed questions to the QA system pipeline(s) 300, the illustrative embodiments may select a corrected/transformed question from those output by the flow paths 382-386 based on predetermined criteria identifying the best corrected/transformed question to process by the QA system pipeline 300. For example, scoring algorithms may be utilized to score the corrected/transformed questions based on the grammar, syntactic parse tree, and likelihood of being answered correctly by the QA system pipeline. The scoring algorithms may be trained using a machine learning process in which a training set of questions and known desired forms of the questions are utilized to measure the effectiveness of pre-processor flow paths 382-386. As noted above, features may be generated for each preprocessor path describing how much of the question was changed by the preprocessor path and how confident the system is in the changes made. Based on the final comparison scores from the different paths, machine learning can be used to determine what the optimal weights are for the features such that the scoring algorithms can apply these weights when generating scores for the results they generate such that a single result of a single pre-processor flow path may be selected for further processing, i.e. a single corrected/transformed question is selected from one of the pre-processor flow paths 382-386.

In the case of a single corrected/transformed question being selected for further processing by the QA system pipeline 300, the QA system pipeline 300 operates on the selected corrected/transformed question in the same manner as previously described above to generate a final answer and/or final set of candidate answers that are output to the submitter of the original input question. The processing of the corrected/transformed question is optimized through the use of the pre-processors to correct/transform the question into a form that is more likely to be processed efficiently and correctly with a high likelihood of resulting in a correct answer. This correction/transformation may involve removal of superfluous information content and/or additional of elided information content.

As mentioned above, the pre-processor flow paths 382-386 are comprised of one or more pre-processors. These pre-processors may include pre-processors for performing various corrections and transformations of the input question to improve efficient and correct processing of the input question. Examples of such pre-processors include superfluous information pre-processors and elided information pre-processors. These are only examples and other types of pre-processors may be used in addition to, or in replacement of, these pre-processors in one or more of the pre-processor flow paths 382-386.

Figure 4:
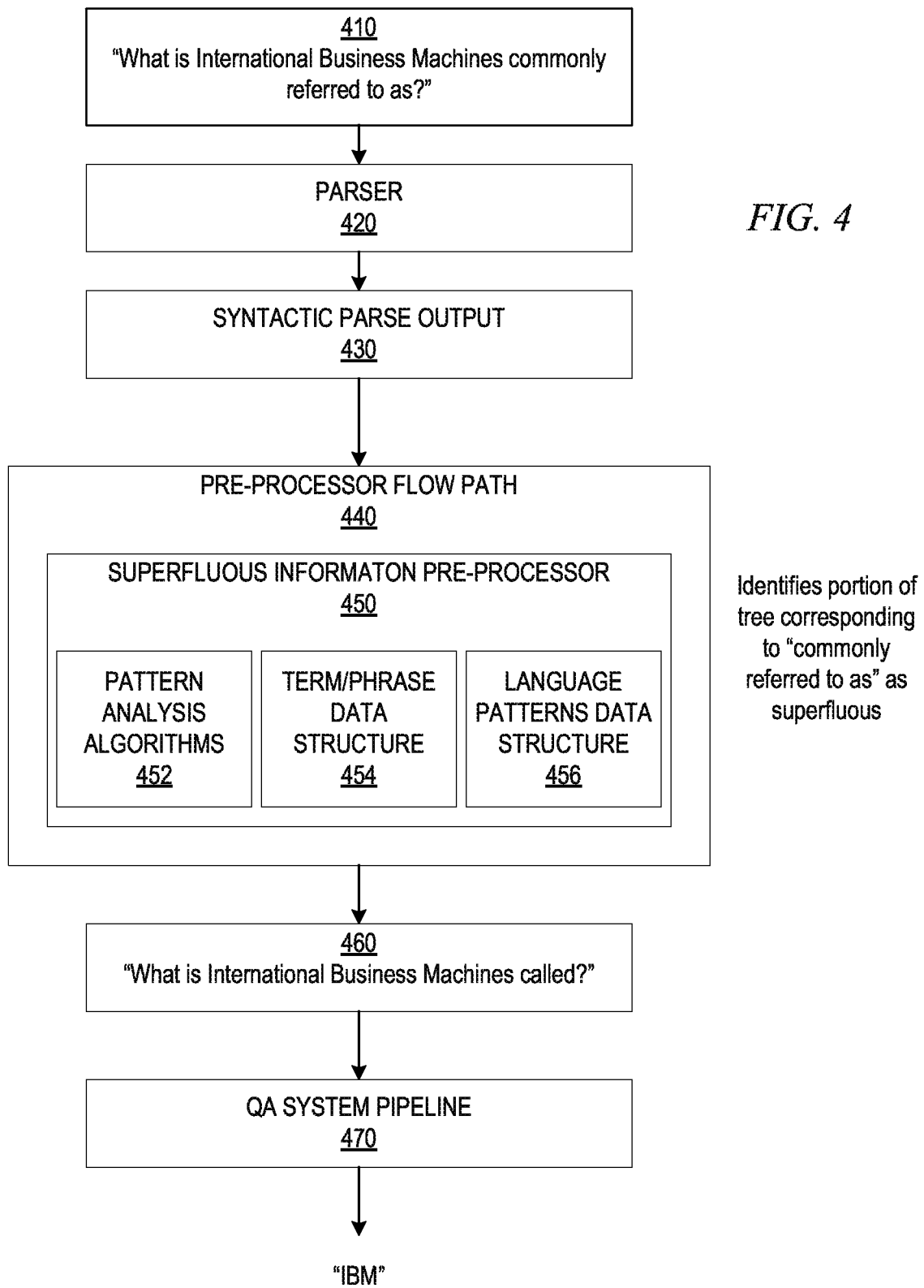
FIG. 4 is an example diagram illustrating the operation of a superfluous information pre-processor in accordance with one illustrative embodiment.

FIG. 4 is an example diagram illustrating the operation of a superfluous information pre-processor in accordance with one illustrative embodiment. In a question answering (QA) system, every portion of an input question is considered to be an important part of the input question and needs to be searched for using the query generation and application mechanisms of the QA system pipeline. In addition, the results generated by the processing of every portion of the input question must be scored and candidate answers generated. However, some questions may have extraneous or superfluous information that is not relevant to the actual question and will, in essence, distract the QA system and either cause the QA system to utilize extra resources and time to process the input question or even worse, may cause an incorrect scoring and selection of candidate answers by the QA system.

There are two basic forms of extraneous of superfluous information content in an input question: vocative clauses and common turns of phrase (referred to herein as "common phrases"). Identifying and removing these extraneous or superfluous portions of content in an input question can be accomplished through regular expression matching and syntactic parse matching. A combination of these two schemes for removal of extraneous or superfluous portions of content in an input question can effectively identify vocative clauses and common phrases and remove them such that the remaining portion of the input question may be reformulated into a logical question that will be more efficiently and correctly processed by the QA system.

As shown in FIG. 4, the input question 410 is input to the QA system pipeline which includes the parsing of the input question 410 by a parser 420 into a syntactic parse output 430. The syntactic parse tree is input to a pre-processor flow path 440 comprising the superfluous information pre-processor 450. The superfluous information pre-processor 450 analyzes the syntactic parse output 430 to identify portions of the input question 410 that are not necessary to correct processing of the input question 410 or will cause resource utilization without an appreciable increase in the correctness of generated answer results.

In order to perform such analysis, the superfluous information pre-processor 450 utilizes pattern analysis algorithms 452, term/phrase data structure 454, language patterns data structure 456, and the like, to identify such superfluous information. For example, the superfluous information pre-processor 450 uses algorithms 452 to perform regular expression matching and syntactic parse analysis on the parse output 430. The pattern analysis algorithms 452 provide logic for identifying different patterns of terms, phrases, grammar, punctuation, or any other natural language patterns that are indicative of information content in an input question that does not add to the understanding of the input question for purpose of answering the input question, i.e. information content of the input question that does not add to an improved processing of the input question. The term/phrase data structure 454 and language patterns data structure 456 may be utilized by the pattern analysis algorithms 452 to identify terms/phrases and language patterns in input questions that are indicative of superfluous information in the input question 410. In addition, these data structures 452-456 may further map the identified terms/phrases and patterns to corrected terms/phrases or patterns, e.g., the phrase "referred to as" may be corrected to "called" or "named." If there is no mapping of the term/phrase or pattern to another corrected term/phrase or pattern, then it can be determined that the term/phrase or pattern is to be eliminated from the input question without replacement by a corrected term/phrase or pattern.

These terms/phrases and language patterns may be populated in the data structures 454 and 456 manually or automatically. These data structures may be populated automatically through a machine learning process. The learning process may comprise identifying the terms/phrases and patterns in previously processed input questions, evaluating the terms/phrases to determine their influence on the correct processing of the input question and, if determined to be sufficiently low with regard to their influence to the identification of a correct answer to the previously submitted input question, may be added to the appropriate data structure 454 or 456. It should be appreciated that "sufficiently" low may be measured according to a pre-determined threshold condition.

In one illustrative embodiment, such machine learning can be performed using a training set of input questions with corresponding appropriately modified/corrected text, i.e. the desired form of the question. The system may parse the two texts and analyze the syntactic structures to determine what operations would need to be performed to achieve the desired result of the appropriately modified/corrected text. The identified operations may then be tested on other training questions to ensure that the operations create a desired form of modified/corrected question in all or at least a majority of circumstances. These operations are then learned and used in future processing. Of course other mechanisms for machine learning to identify superfluous information terms/patterns may be used without departing from the spirit and scope of the present invention.

The identified superfluous information in the input question 410 may be removed from the input question to transform or correct the input question 410 and thereby generate the corrected/transformed question 460 which is output to the QA system pipeline 470. In generating the corrected/transformed question 460, if the elimination of the superfluous information content results in an error in the remaining language, e.g., wrong tense of a term/phrase, missing information, or the like, proper correction of the remaining portion of the input question 410 may be performed so as to generate a logical question for additional or subsequent processing by the QA system pipeline 470, such as through the various stages of the QA system pipeline 300 shown in FIG. 3. For example, the corrected/transformed question 460 may be passed to additional pre-processors in the pre-processor flow path 440 for additional correction/transformation and/or passed to subsequent stages of the QA system pipeline 300.

To give a concrete example of the operation of the superfluous information pre-processor, consider the depicted example input question of "What is International Business Machines commonly referred to as?" Through processing by the superfluous information pre-processor 450 using the terms/phrases and patterns specified in the data structures 454 and 456, as well as the logic provided in the algorithms 452, the superfluous information pre-processor 450 identifies the phrase "commonly referred to as" as being superfluous or not relevant to the underlying question. For example, the term "commonly" may be a trigger term identified in the terms/phrases data structure 454 and the phrase "referred to as" may be included in the data structure 454 with a mapping to another more efficiently and correctly processed term/phrase of "called." Thus, in transforming the input question 410, the pre-processor 450 may remove the original phrase of "commonly referred to as" and replace it with the term "called" to generate a corrected/transformed input question of the type "What is International Business Machines called?"

This is an example of the identification and correction/transformation of common phrases found in an input question. As mentioned above, another type of superfluous or extraneous information content found in input questions is vocative clauses. For example, in the question "Can you please tell me who the president is?" which includes the vocative clause "can you please tell me." A syntactic pattern matching algorithm in the algorithms 452 may identify, using the language patterns data structure 456, the phrase "can tell" to be a verb with an indirect object of "me." As a result, the pre-processor 450 may remove the clause "can you please tell me" from the input question 410 altogether and reformatted to generate the resulting corrected/transformed question of "who is the president?" Notice that the question has been reformatted to present a logically and syntactically correct question rather than simply submitting the input question with the vocative clause removed, i.e. "who the president is?" is reformatted to "who is the president?"

Figure 5:
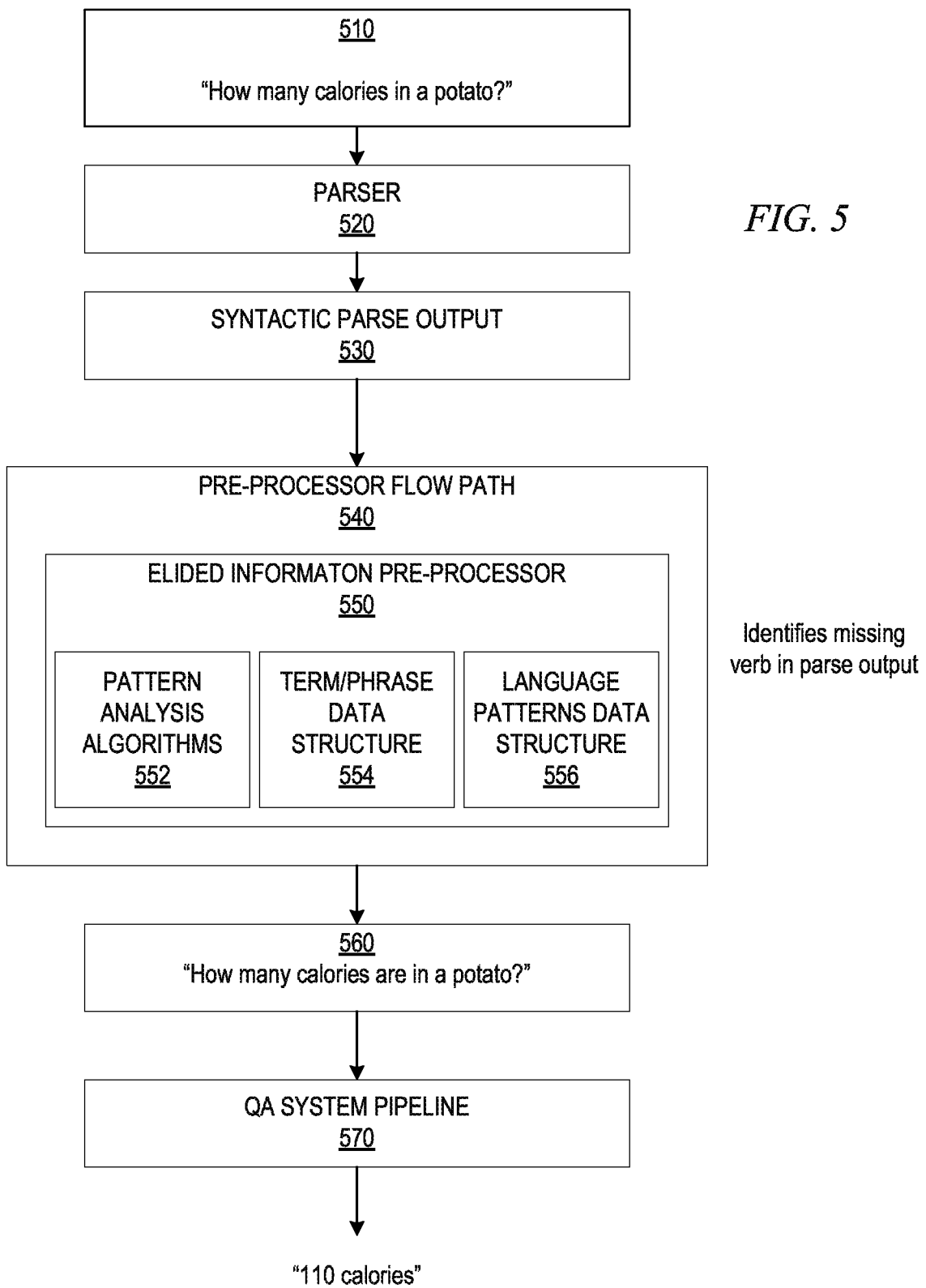
FIG. 5 is an example diagram illustrating the operation of an elided information pre-processor in accordance with one illustrative embodiment.

As mentioned above, one of the other pre-processors that may be implemented in illustrative embodiments of the present invention is an elided information pre-processor that identifies missing information in an input question. FIG. 5 is an example diagram illustrating the operation of an elided information pre-processor in accordance with one illustrative embodiment. In standard human communication, leaving out certain information content in a question is a natural occurrence since people are able to "fill in the blanks" without the missing information content having to be explicitly stated. These "blanks" cause many problems, however, for parsers and other elements of analysis in QA systems which look at only the explicitly presented information content of the input question for purposes of parsing, analysis, query generation, and candidate answer selection and scoring.

Some forms of missing information in questions include elided focus, elided verb, elided noun phrases, and the like. The mechanisms of the illustrative embodiments are able to identify such elided information using an elided information pre-processor 550. Similar to the operation shown in FIG. 4, the input question 510 is input to the QA system pipeline which includes the parsing of the input question 510 by a parser 520 into a syntactic parse tree 530. The syntactic parse tree 530 is input to a pre-processor flow path 540 comprising the elided information pre-processor 550. The elided information pre-processor 550 analyzes the syntactic parse tree 530 to identify portions of the input question 510 that are indicative of missing or elided information in the input question 510.

In order to perform such analysis, the elided information pre-processor 550 utilizes pattern analysis algorithms 552, term/phrase data structure 554, language patterns data structure 556, and the like, to identify trigger terms and language patterns in the input question 510 indicative of elided information in the input question 510, e.g., an elided focus, an elided verb, missing noun phrases, or the like. For example, the elided information pre-processor 550 uses algorithms 552 to perform regular expression matching and syntactic parse analysis on the parse tree 530. The pattern analysis algorithms 552 provide logic for identifying different patterns of terms, phrases, grammar, punctuation, or any other natural language patterns that are indicative of information content being missing from an input question. The term/phrase data structure 554 and language patterns data structure 556 may be utilized by the pattern analysis algorithms 552 to identify terms/phrases and language patterns in input questions that are indicative of such missing information in the input question 510. In addition, these data structures 554-556 may further map the identified patterns indicative of missing information to corrected patterns and/or natural language processing algorithms for determining the information that should be added to provide a correctly formed question, e.g., if the identified pattern is indicative of a missing verb the data structures 554-556 may map an identification of a missing verb to a natural language processing algorithm that processes the language of the input question to identify the type of verb that needs to be inserted. The same can be done for various types of missing information including missing focus, missing noun phrases, and the like.

As with the superfluous information pre-processor, these terms/phrases and language patterns may be populated in the data structures 554 and 556 manually or automatically. These data structures may be populated automatically through a machine learning process. The machine learning process may comprise identifying the terms/phrases and patterns in previously processed input questions, evaluating the terms/phrases to determine their impact on the correct processing of the input question and, if determined to be sufficiently high with regard to a negative impact on the identification of a correct answer to the previously submitted input question, may be added to the appropriate data structure 554 or 556. It should be appreciated that "sufficiently" high may again be measured according to a pre-determined threshold condition. The determination of terms/phrases and patterns indicative of elided information may be learned through a combination of the machine learning that is done for superfluous information and checking for predetermined conditions within the parse tree of the input question. These predetermined conditions may comprise various conditions, such as an incorrect parse of the question due to a missing portion of the question, a certain component is missing an expected counterpart or associated part of the question, e.g., a verb missing an object, or other patterns that indicate required content in the question that is in fact not present.

The identified elided information in the input question 510 may be inserted into the input question 510 to transform or correct the input question 510 and thereby generate the corrected/transformed question 560 which is output to the QA system pipeline 570. In generating the corrected/transformed question 560, proper correction and reformatting of the input question 510 may be performed to accommodate the inserted missing information so as to generate a logically and syntactically correct question for additional processing by the QA system pipeline 570, such as through the various stages of the QA system pipeline 300 shown in FIG. 3. In some embodiments, the additional correction/reformatting may be accomplished by passing the corrected/transformed question 560 having the inserted missing information to additional pre-processors in the pre-processor flow path 540 for additional correction/transformation.

To give a concrete example of the operation of the elided information pre-processor, consider the depicted example input question of "How many calories in a potato?" Through processing by the elided information pre-processor 550 using the terms/phrases and patterns specified in the data structures 554 and 556, as well as the logic configured in the algorithms 552, the elided information pre-processor 550 identifies the pattern of the input question to be indicative of a missing verb by parsing the input question 510 and determining that the question, while having the adverb "how", adjective "many" corresponding to the noun "calories", etc., is missing the verb that is modified by the adverb "how". Having identified the verb to be missing, natural language processing algorithms may be invoked to identify the form of the verb to be missing from the question and thereby insert the missing information in the question. For example, in the depicted example, the question "How many calories in a potato?" may be analyzed and determined to be missing a "be" verb of the type "are" and this verb term may be inserted into the input question 510 to generate the corrected/transformed question 560 "How many calories are in a potato?"

This is an example of the identification and correction/transformation of an elided verb in an input question. As mentioned above, other types of missing information in input questions include an elided focus, an elided noun phrase, or the like. For example, with regard to an elided focus, consider the question "Two hydrogen atoms and one oxygen atom form?" which is missing the direct object, or focus, of the input question. The elided information pre-processor may analyze the parse of the input question and determine that the direct object or focus of the input question is missing and invoke the natural language processing algorithms to determine the form of the focus that should be inserted. In this case, the term "what" can be inserted at the end of the question to generate a corrected/transformed question of the type "Two hydrogen atoms and one oxygen atom form what?" which indicates to the QA system that an object is being sought by the input question, i.e. what is being looked for is an object that is formed from a two hydrogen atoms and one oxygen atom.

As another example, with regard to an elided noun phrase, consider the question "President of the United States?" which is missing the implied "who is" phrase. The elided information pre-processor of the illustrative embodiments may identify this implied phrase as missing from the input question and may correct/transform the input question into the corrected/transformed question "Who is the President of the United States?"

The elided information pre-processor of the illustrative embodiments identifies such terms/phrases and patterns indicative of elided information by parsing the question and analyzing/matching the terms/phrases and language of the question to predetermined terms/phrases and patterns indicative of elided information and a set of features corresponding to the matched terms/phrases and patterns are identified with the remaining missing pieces or features of the question being generated according to the domain and context information (such as a dialogue in which the question appears). For example, with the example question of "President of the United States" a pattern indicative of a missing noun phrase is matched with the parsing and features present in the question and indication of the pieces of the question that should be present but are not. In this example, the text of the question may be analyzed to identify that the answer sought is singular and represents a person. Without other context being utilized, this resulting identification of elided information will default to pre-pending the question with "Who is" because of these identified features present in the question and the identification of a lack of a noun phrase.

It should be appreciated that the mapping of superfluous terms/phrases to replacement terms/phrases and the identification of missing information from input questions may be performed in a context and domain specific manner. That is, the various data structures used by the pre-processors may be configured specifically to a particular domain such that the same terms/phrases in different domains may map to different replacement terms/phrases. Moreover, the missing information to be inserted into a question may be of a specific type for a domain such that, for example, a missing noun phrase in one domain may be mapped to a first noun phrase type while the same identification of a missing noun phrase in another domain may be mapped to a second noun phrase type different from the first noun phrase type.

For example, terms/phrases may have different levels of importance in different contexts. As an example, the term "preferred" is an important clarifying term in an insurance domain because it is a term that is often used as part of a plan name and refers to different levels of coverage or membership. However, in other domains, such as an automobile domain, the term may require a transformation to other terms that are less superfluous. For example, in an insurance domain, the question "How do I get on the preferred plan?" would not need to be changed since the term "preferred" is important to answering the question. However, for the question "What car do you prefer?" the phrase "do you prefer" is superfluous or has an implied meaning indicative of missing information. Thus, the question processing may require the question to be changed to form in which the term/phrase "do you prefer" is modified to be of the type "What is the best car?" that is more likely to be answered correctly by the question answering system.

Moreover, the domain and context in which the input question is received may be analyzed to determine appropriate correction/transformation of the input question in response to the detection of missing information in the input question. For example, depending on the domain and context of the conversation or session in which the input question is submitted, different missing information may be inserted into the input question. As an example consider a conversation with an insurance policy representative of an insurance company via an on-line interaction between a potential customer and the insurance company sales representative. The customer may present textual input indicating that the customer is interested in getting information about various insurance policies. During the conversation, the customer may present the question "Premium plan?" As is readily apparent, this question, presented in other domains and contexts may make reference to a plethora of different types of "premium plans" and may be requesting various types of different information regarding the "premium plan" in both the insurance domain and other domains.

For example, in a default operation without taking into account the context of the question, this question may be modified to include the elided phrase "What is" pre-pended to the claim to form the question "What is a premium plan?" Adding consideration of the domain being an insurance domain may cause the elided information that is added to the question to be of the type "What are the details of a premium plan?" since it is known that the questioner, within an insurance domain, knows that a premium plan is a type of insurance plan and is in actuality most likely looking for details of the premium plan. Adding to the considerations, if the context of the question is part of a dialogue history regarding pricing within the insurance domain, the question may instead be modified to be of the type "What is the cost of a premium plan?" Thus, the domain and context provide features that may be included in the analysis and evaluations performed by the system to determine the intent of the original question and the most likely form of the elided information so that the original question may be modified to include the most likely missing information.

Through an analysis of the context of the conversation up to the point of the input question, the elided information pre-processor may determine that the customer is looking for information regarding the details of the premium plan offered by the insurance company. As a result, the elided information pre-processor may identify the missing information to be an implied noun phrases and that, based on the domain and context, a missing implied noun phrase qualifier is "details of" with a focus of "what" on "details". As a result, the elided information pre-processor may correct/transform the input question into a form of "What are the details of the premium plan?" which may then be submitted to the QA system for additional processing and generation of an answer to the input question.

Again, the superfluous information pre-processor and elided information pre-processor are only examples of the types of pre-processors that may be used to correct/transform the input question into a corrected/transformed question that may be more efficiently processed (with less resource consumption) and done so with a greater likelihood of a correct answer being generated by the processing of the QA system pipeline.

Figure 6:
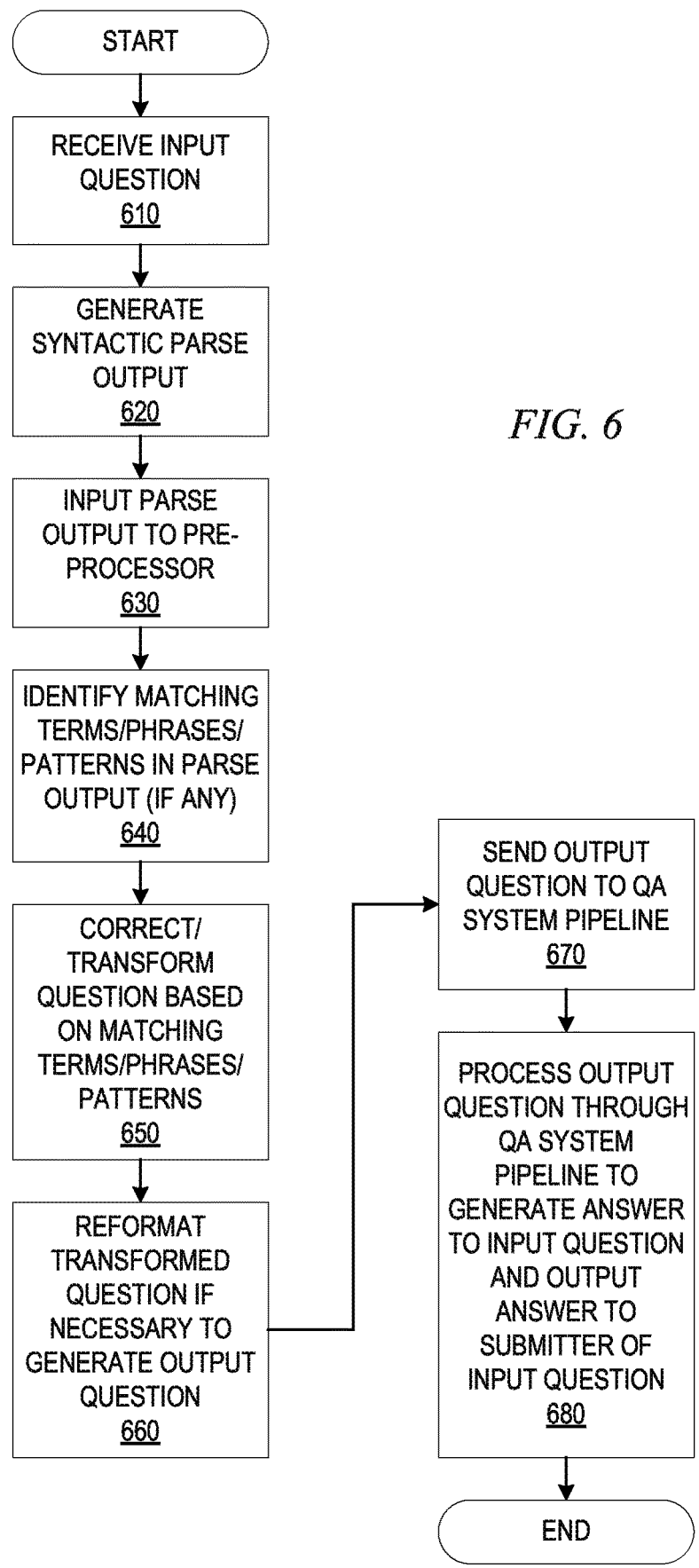
FIG. 6 is a flowchart outlining an example operation for pre-processing an input question in accordance with one illustrative embodiment.

FIG. 6 is a flowchart outlining an example operation for pre-processing an input question in accordance with one illustrative embodiment. The operation outlined in FIG. 6 includes steps performed by various parts of a QA system pipeline with the pre-processing of the input question being performed as part of this processing by the QA system pipeline. Thus, in the example operation of FIG. 6, the pre-processing is integrated in the QA system pipeline, however the illustrative embodiments are not limited to such and the pre-processing may be performed as a separate operation from the processing performed by the QA system pipeline with the output from the pre-processors being input as an input question to the QA system pipeline.

As shown in FIG. 6, the operation starts with the receipt of an input question from a client computing device or other source of an input question (step 610). For example, a user may use their client computing device to log onto a QA system through a network, e.g., a client computer logging onto a website associated with the QA system via the Internet, and may enter a question that the user wishes to have answered by the QA system. This may be a direct entry of the input question into an interface provided by the QA system or the QA system may operate in more of a background mode of operation such that the question may be presented in the context of a conversation or textual exchange between the user and another person via a communication system with which the QA system is associated, e.g., a website, an instant messaging system, or the like.

The input question is analyzed to generate a syntactic parse output (step 620) which is input to one or more pre-processor flow paths (step 630) (it will be assumed for simplicity that a single flow path is utilized with a single pre-processor, but this is not intended to be limiting on the present invention as already discussed above). The pre-processor analyzes the terms/phrases in the input question based on the syntactic parse tree and performs regular expression matching and syntactic parse tree pattern analysis to determine if any regular expressions or patterns looked for by the pre-processor are matched by the input question (step 640). As noted above, in some illustrative embodiments this may involve the identification of superfluous content in the input question, such as vocative clauses or common phrases, and/or elided information, such as elided verbs, elided focus, elided noun phrases, and the like.

Any matching regular expressions or patterns are then corrected by the pre-processor to generate a corrected/transformed input question (step 650). The corrected/transformed input question is then reformatted if necessary to ensure that the resulting question is presented in a logically and syntactically correct manner (step 660). It should be appreciated that steps 650 and 660 are conditional and may not be performed if the input question is properly formatted and does not have any matching regular expressions or patterns identified by the pre-processor in step 640.

The resulting output question is sent to the QA system pipeline for further processing (step 670). The QA system pipeline generates candidate answers and/or a final answer to the output question from the pre-processor flow path and returns the final answer and/or candidate answers to the submitter of the original input question, potentially in a ranked listing along with confidence scores and information about the evidence used to generate the confidence scores (step 680). The operation then terminates.

Thus, the illustrative embodiments provide mechanisms for correcting and transforming input questions for more efficient and accurate processing of input questions by a QA system. The illustrative embodiments, in some implementations, provide pre-processors that correct and transform the input questions before they are input to the QA system pipeline for processing. These pre-processors may include a superfluous information pre-processor that removes information content from the input question that is not necessary or relevant to the underlying question being asked. These pre-processors may also include an elided information pre-processor that analyzes the question, and potentially the domain and context in which the question is presented, to identify information missing from the input question and provide the missing information by inserting it into the question to generate a corrected/transformed question.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a question answering (QA) system comprising a QA system pipeline that analyzes an input question and generates an answer to the input question, for pre-processing the input question, the method comprising:
    receiving, by the QA system, an input question for which an answer is sought by a submitter of the input question;
    inputting, by the QA system, the input question to a pre-processor flow path comprising at least one pre-processor;
    transforming, by the at least one pre-processor, the input question into a transformed question by correcting errors in a formulation of the input question that are determined to be detrimental to efficient and accurate processing of the input question by a QA system pipeline of the QA system, wherein the at least one pre-processor comprises a superfluous information pre-processor and a elided information pre-processor and wherein transforming the input question comprises at least one of:
        identifying, by the superfluous information pre-processor that identifies superfluous information content in the input question and transforms the superfluous information content, at least one of a term, phrase, or language pattern indicative of superfluous information content in the input question that is not relevant to the underlying question being asked by the input question; and
        removing, by the superfluous information pre-processor, the superfluous information content from the input question to generate a modified input question; or
        identifying, by the elided information pre-processor that identifies elided information content associated with the input question and transforms the input question based on the identified elided information, at least one of a term, phrase, or language pattern indicative of elided information content in the input question that is relevant to the underlying question being asked by the input question and is missing in the input question; and
        inserting, by the elided information pre-processor, the elided information content into the input question to generate the modified input question;
    in response to determining that the modified input question requires reformatting, reformatting, by the at least one pre-processor, the input question into a logically and syntactically correct input question;
    outputting, by the at least one pre-processor, the logically and syntactically correct input question as the transformed question;
    inputting, by the at least one pre-processor, the transformed question to the QA system pipeline of the QA system; and
    processing, the transformed question via the QA system pipeline to generate and output at least one answer to the input question.

2. The method of claim 1, wherein identifying at least one of the term, phrase, or language pattern indicative of superfluous information content in the input question comprises identifying at least one of a vocative clause or a common phrase in the input question.

3. The method of claim 1, wherein identifying at least one of the term, phrase, or language pattern indicative of the elided information content in the input question comprises identifying at least one of an elided focus, an elided verb, or an elided noun phrase.

4. The method of claim 1, wherein inserting the elided information content into the input question to generate the modified input question comprises analyzing, by the elided information pre-processor, at least one of a domain or a context associated with the input question to determine the elided information content to be inserted into the input question.

5. A computer program product comprising a non-transitory computer readable storage medium having a computer readable program stored therein, wherein the computer readable program, when executed on a computing device implementing a Question Answering (QA) system, causes the computing device to:
    receive, by the QA system, an input question for which an answer is sought by a submitter of the input question;
    input, by the QA system, the input question to a pre-processor flow path comprising at least one pre-processor;
    transform, by the at least one pre-processor, the input question into a transformed question by correcting errors in a formulation of the input question that are determined to be detrimental to efficient and accurate processing of the input question by a QA system pipeline of the QA system, wherein the at least one pre-processor comprises a superfluous information pre-processor and a elided information pre-processor and wherein transforming the input question comprises at least one of:
        identifying, by the superfluous information pre-processor that identifies superfluous information content in the input question and transforms the superfluous information content, at least one of a term, phrase, or language pattern indicative of superfluous information content in the input question that is not relevant to the underlying question being asked by the input question; and
        removing, by the superfluous information pre-processor, the superfluous information content from the input question to generate a modified input question; or
        identifying, by the elided information pre-processor that identifies elided information content associated with the input question and transforms the input question based on the identified elided information, at least one of a term, phrase, or language pattern indicative of elided information content in the input question that is relevant to the underlying question being asked by the input question and is missing in the input question; and
        inserting, by the elided information pre-processor, the elided information content into the input question to generate the modified input question;
    in response to determining that the modified input question requires reformatting, reformatting, by the at least one pre-processor, the input question into a logically and syntactically correct input question;

outputting, by the at least one pre-processor, the logically and syntactically correct input question as the transformed question;

input, by the at least one pre-processor, the transformed question to the QA system pipeline of the QA system; and process, by the QA system, the transformed question via the QA system pipeline to generate and output at least one answer to the input question.

6. The computer program product of claim 5, wherein the computer readable program further causes the computing device to identify at least one of the term, phrase, or language pattern indicative of superfluous information content in the input question at least by identifying at least one of a vocative clause or a common phrase in the input question.

7. The computer program product of claim 5, wherein the computer readable program further causes the computing device to insert the elided information content into the input question to generate the modified input question at least by analyzing, by the elided information pre-processor, at least one of a domain or a context associated with the input question to determine the elided information content to be inserted into the input question.

8. The computer program product of claim 5, wherein identifying at least one of the term, phrase, or language pattern indicative of the elided information content in the input question comprises at least one of an elided focus, an elided verb, or an elided noun phrase.

9. An apparatus comprising:

a processor; and a memory coupled to the processor, wherein the memory comprises instructions which, when executed by the processor implementing a Question Answering (QA) system, cause the processor to:

receive, by the QA system, an input question for which an answer is sought by a submitter of the input question;

input, by the QA system, the input question to a pre-processor flow path comprising at least one pre-processor;

transform, by the at least one pre-processor, the input question into a transformed question by correcting errors in a formulation of the input question that are determined to be detrimental to efficient and accurate processing of the input question by a QA system pipeline of the QA system, wherein the at least one pre-processor comprises a superfluous information pre-processor and a elided information pre-processor and wherein transforming the input question comprises at least one of:

identifying, by the superfluous information pre-processor that identifies superfluous information content in the input question and transforms the superfluous information content, at least one of a term, phrase, or language pattern indicative of superfluous information content in the input question that is not relevant to the underlying question being asked by the input question; and removing, by the superfluous information pre-processor, the superfluous information content from the input question to generate a modified input question; or identifying, by the elided information pre-processor that identifies elided information content associated with the input question and transforms the input question based on the identified elided information, at least one of the term, phrase, or language pattern indicative of elided information content in the input question that is relevant to the underlying question being asked by the input question and is missing in the input question; and inserting, by the elided information pre-processor, the elided information content into the input question to generate the modified input question;

in response to determining that the modified input question requires reformatting, reformatting, by the at least one pre-processor, the input question into a logically and syntactically correct input question;

outputting, by the at least one pre-processor, the logically and syntactically correct input question as the transformed question;

input, by the at least one pre-processor, the transformed question to the QA system pipeline of the QA system; and process, by the OA system, the transformed question via the QA system pipeline to generate and output at least one answer to the input question.

10. The apparatus of claim 9, wherein the instructions further cause the superfluous information pre-processor to identify at least one of the term, phrase, or language pattern indicative of superfluous information content in the input question at least by identifying at least one of a vocative clause or a common phrase in the input question.

11. The apparatus of claim 9, wherein identifying at least one of the term, phrase, or language pattern indicative of the elided information content in the input question comprises at least one of an elided focus, an elided verb, or an elided noun phrase.

12. The apparatus of claim 9, wherein the instructions further causes the elided information pre-processor to insert the elided information content into the input question to generate the modified input question at least by analyzing, by the elided information pre-processor, at least one of a domain or a context associated with the input question to determine the elided information content to be inserted into the input question.

* * * * *